May 28, 1929.   H. W. McMILLAN   1,715,244
SPACING ATTACHMENT FOR ANGLE PUNCHING MACHINES
Filed Aug. 1, 1927
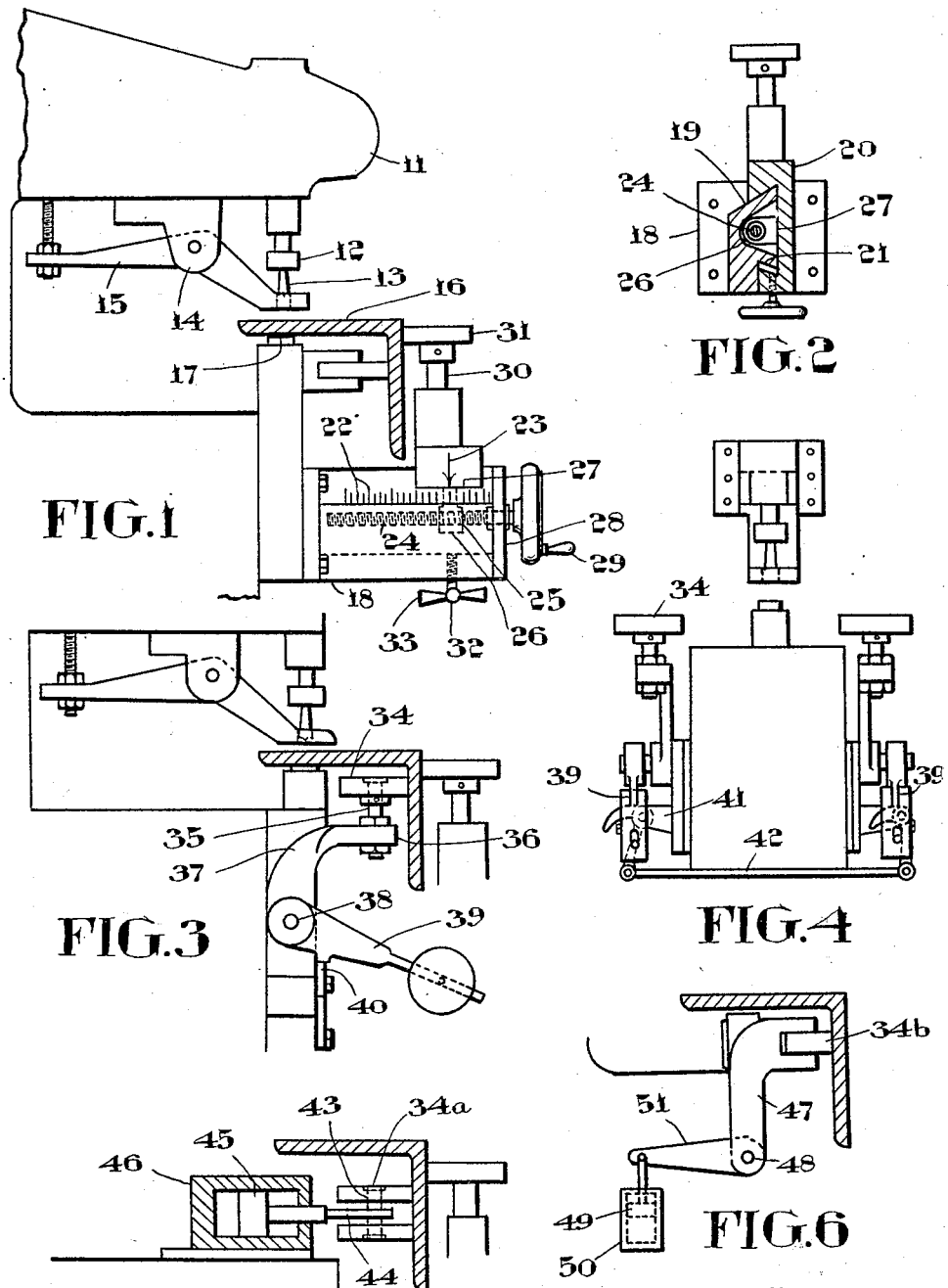
INVENTOR
HERBERT W. McMILLAN
BY Fetherstonhaugh & Co
ATTORNEYS Patented May 28, 1929.

1,715,244

UNITED STATES PATENT OFFICE.

HERBERT W. McMILLAN, OF LACHINE, QUEBEC, CANADA.

SPACING ATTACHMENT FOR ANGLE-PUNCHING MACHINES.

Application filed August 1, 1927. Serial No. 209,924.

This invention relates to new and useful improvements in punching machine attachments, and the object of the invention is to provide a device which may be quickly and readily attached to a punching machine to facilitate the punching of holes in structural angles at a predetermined gauge distance from the edges or sides of the angle.

Another object is to provide an attachment which will allow adjustments to be accurately made to suit the different sizes of angles that have to be punched.

According to my invention I provide a gauge bracket which is attached to the base of the punching machine and adjustably mounted in the said bracket is the gauge block with positioning means to allow easy sliding movement of the angle through the machine. Also attached to the machine is roller means for holding the angle against the angle positioning means. The gauge block may be locked in any desired position.

In the drawing which illustrates various forms of my invention;

Figure 1 is a side elevation showing the jaws of a punching machine with the adjustable gauge attached thereto.

Figure 2 is a sectional end elevation of the gauge.

Figure 3 is a side elevation of one type of gravity controlled angle holding mechanism.

Figure 4 is an end elevation of the device shown in Figure 3.

Figure 5 shows a pneumatically operated angle holding device.

Figure 6 is a side elevation of a modified type of pneumatically operated angle holding device.

Referring more particularly to the drawings, 11 designates the punching machine and slidably mounted in the head thereof, in the usual manner, is the punch holder 12 and punch 13. Secured to the underside of the head is the adjustable stripper mechanism 14, the lever 15 of which is apertured to allow for the passage therethrough of the punch. The punch in its downward movemeans passes through the aperture in the stripper block and pierces the angle 16 which is resting on the die block 17 secured to the base of the machine. The mechanism shown is illustrative of one of the many types of punching machines which may be used. Secured to the face of the base of the machine is the gauge bracket 18, part 19 of which is dovetailed to receive the gauge block 20 which is provided with a dovetailed recess 21. The bracket is provided with a series of scribed or marked dimension lines 22, and on the gauge block a single line or arrow 23 is marked or formed to form in conjunction with lines 22 a gauging means for the angles. Rotatably mounted in the bracket is the threaded spindle 24 which engages with a similarly threaded aperture 25 formed in a lug 26 projecting outwardly from the face 27 of the gauge block. The spindle 24 is prevented from longitudinal movement and is held in suitable bearings by means of the plate 28 secured to the face of the bracket. A handle 29 is secured to the spindle. Rotatably mounted on the top of the gauge block is the spindle 30 and secured to said spindle is the roller 31, which engages with the face of the angle under operation. By rotating the threaded spindle the gauge block may be moved in the horizontal direction to and away from the centre of the punch, so that by proper gauging, the gauge distance between the roller 31 and the centre of the punch may be adjusted to within very fine limits. The gauge block may be held in any adjusted position by means of the threaded locking bolt 32, which has an operating handle 33. To hold the angle against the gauge roller, various types of mechanism may be used and in Figures 3 and 4, a gravity operated device is shown. Rollers are preferably used and these rollers 34 may be rotatably mounted on spindles 35 adjustably secured to the apertured ends 36 of the levers 37 secured to a shaft 38, rotatably mounted in the base of the machine. Weighted levers 39 are also secured to the shaft 38 in such a position that they cause the roller to press against the face of the angle under operation. The rollers 34 may be held clear of the angle by means of cams 40, which are secured by brackets 41 to the base of the machine. The cams are positioned one on each side of the base and may be connected to move in unison by means of the rod 42. The cams are so positioned that they engage with the levers 39 to hold them in such a position that the rollers 34 are held clear of the angles.

In Figure 5, the rollers 34ª are shown rotatably mounted on a pin 43 passing through the free end of a piston rod 44, the piston 45 of which operates in a cylinder 46 which may be supplied with fluid under pressure from any source, not shown, to force the rollers against the angle.

In Figure 6, the roller 34^b is rotatably mounted in the free end of a bifurcated lever 47 secured to a shaft 48 rotatably mounted in the base. The shaft is rotated by means of a fluid operated piston 49 working in a cylinder 50 and connected to the shaft by means of a lever 51. The devices shown are illustrative of types of mechanism which may be modified to suit conditions and locations of the machine.

In operation the guage block is moved horizontally in the bracket until the distance between the centre of the punch and the adjacent face of the roller is at a predetermined gauge measure and this may be accurately set by means of the markings on the bracket and the gauge block. The gauge block is then held in position by means of the lock screw. The angle to be punched is then placed in position with one leg resting on the die block and the other engaging with the face of the vertically disposed leg of the angle. The holding rollers are then allowed to contact with the said vertical leg to hold the angle against the gauge roller.

The holes in the angle may then be punched in the usual manner. By providing rollers, the angles may be very conveniently moved through the machine.

The device is simple in operation and provides a mechanism which ensures that all holes punched in the angle in one setting are at a predetermined gauge from the heel of the angle. The device is easily attached to the punching machine and can be easily adjusted by the operator.

Having thus described my invention, what I claim is:—

1. In combination with an angle punching machine, a gauging attachment comprising a bracket secured to the base of the machine and provided with suitably inscribed measuring means, a gauge block slidably secured to the bracket, means for moving the block on the bracket at right angles to the longitudinal axis of the angle, a roller rotatably secured to the block and adapted to contact with the side of the angle, means to lock the block on the bracket at any desired distance from the punch, and means to hold the angle against the roller.

2. In combination with an angle punching machine, a gauging attachment comprising a bracket, secured to the base of the machine, a gauge block slidably secured to the bracket, said bracket and base being suitably marked to form a measuring means between the punch and the gauge block, a roller rotatably mounted on the gauge block and adapted to contact with the side of the angle, spaced rollers adapted to press the angle against the gauge roller, means to lock the gauge block in any desired position with respect to the punch, and means to hold the spaced rollers clear of the angle.

In witness whereof, I have hereunto set my hand.

HERBERT W. McMILLAN.